US008704642B2

(12) United States Patent
Chen

(10) Patent No.: US 8,704,642 B2
(45) Date of Patent: Apr. 22, 2014

(54) RFID-BASED INTELLIGENT STORAGE CABINET AND THE MANAGEMENT METHOD THEREOF

(75) Inventor: Horng-Ji Chen, Hsinchu (TW)

(73) Assignee: Claridy Solutions, Inc., Hsinchu (TW)

( * ) Notice: Subject to any disclaimer, the term of this patent is extended or adjusted under 35 U.S.C. 154(b) by 255 days.

(21) Appl. No.: 13/243,561

(22) Filed: Sep. 23, 2011

(65) Prior Publication Data

US 2012/0161944 A1   Jun. 28, 2012

(30) Foreign Application Priority Data

Dec. 28, 2010   (TW) ................................ 99146227 A

(51) Int. Cl.
*H04Q 5/22*   (2006.01)
(52) U.S. Cl.
USPC ... 340/10.6; 340/10.1; 340/572.1; 340/572.7; 340/603; 235/382; 700/241; 700/275; 707/758; 709/229
(58) Field of Classification Search
USPC ........... 340/10.1, 572.1, 572.7, 603; 235/382; 700/241, 275; 707/758; 709/229
See application file for complete search history.

(56) References Cited

U.S. PATENT DOCUMENTS

| | | | |
|---|---|---|---|
| 6,529,956 B1* | 3/2003 | Smith et al. .................... 709/229 |
| 7,486,188 B2* | 2/2009 | Van Alstyne ............... 340/572.1 |
| 7,967,199 B2* | 6/2011 | Linton et al. .................. 235/382 |
| 8,325,013 B2* | 12/2012 | Gerstel ......................... 340/10.1 |
| 2008/0058993 A1* | 3/2008 | Tain et al. ..................... 700/275 |
| 2008/0136598 A1* | 6/2008 | Chen et al. .................... 340/10.1 |
| 2009/0091451 A1* | 4/2009 | Jones et al. ................. 340/572.1 |
| 2009/0153328 A1* | 6/2009 | Otani et al. ................. 340/572.1 |
| 2009/0251293 A1* | 10/2009 | Azevedo et al. ............. 340/10.1 |
| 2010/0138037 A1* | 6/2010 | Adelberg et al. ............. 700/241 |
| 2010/0182149 A1* | 7/2010 | Marino ....................... 340/572.7 |
| 2010/0198848 A1* | 8/2010 | Hoffman et al. ............. 707/758 |
| 2010/0219958 A1* | 9/2010 | Caldwell et al. ............. 340/603 |

* cited by examiner

*Primary Examiner* — Daniel Wu
*Assistant Examiner* — Israel Daramola
(74) *Attorney, Agent, or Firm* — Morris Manning & Martin LLP; Tim Tingkang Xia, Esq.

(57) ABSTRACT

The present invention relates to an RFID-based intelligent storage cabinet and its management method, while utilizing the shielding effect enabled by each partitions for allowing any electromagnetic wave in one compartment to transmit only inside the confinement of such compartment without interfering another compartment. Each stock keeping unit (SKU) that is to be stored in the RFID-based intelligent storage cabinet is attached with at least one RFID tag, and different SKUs of different usages are sorted so as to be stored in different compartments. Moreover, each RFID reader can be designed to function according to the command of a control device for scanning the corresponding compartment in a periodic manner or non-periodic manner, by that any SKU that is stored in the corresponding compartment can be detected and identified as each RFID reader is also connected to an inventory database, a database of item list, or a memory database.

17 Claims, 3 Drawing Sheets

RFID-BASED INTELLIGENT STORAGE CABINET AND THE MANAGEMENT METHOD THEREOF

CROSS-REFERENCE TO RELATED APPLICATIONS

This non-provisional application claims priority under 35 U.S.C. §119(a) on Patent Application No. 099146227 filed in Taiwan (R.O.C.) on Dec. 28, 2010, the entire contents of which are hereby incorporated by reference.

FIELD OF THE INVENTION

The present invention relates to an RFID-based intelligent storage cabinet and its management method, and more particularly, to an RFID-based intelligent storage cabinet capable of detecting and acknowledging precisely the types and amount of items being stored in each and every compartment formed in the cabinet, and thereby, enabling a user to perform operations including: the control of storing/retrieving items into/from compartments of the cabinet, item searching, compartment displaying and indication, inventory management and control, compartment capacity utilization rate statistical analysis, through the use of a compartment management device for facilitating the commodity on-shelf/off-shelf control and management of the cabinet and thus optimizing the utilization of the storage compartments in the cabinet. Moreover, in addition to the use of the detection of bio sensors that are configured in the intelligent storage cabinet for enabling an inventory operation to be performed at a best timing by the use of RFID readers, the cabinet further has other sensors, such as infrared sensors, optical sensors or ultrasonic sensors, that are configured in the compartments formed in the cabinet so as to be used for detecting and determining whether their corresponding compartments are available or are already been occupied, and thus reducing the area in the cabinet required to be scanned by the RFID readers in the inventory operation. Thereby, not only the power consumption is reduced, but also the inventory control of the cabinet can be performed rapidly and accurately while optimizing the utilization of the storage compartments in the cabinet.

BACKGROUND OF THE INVENTION

Radio-frequency identification (RFID) is a technology that uses communication via radio waves to exchange data between a reader and an electronic tag attached to an object, for the purpose of identification and tracking. Generally, an radio-frequency identification system involves RFID readers, RFID tags, and an application system. It is noted that the RFID system can be designed to operate using RFID tags of different radio frequencies under different regulations, including low-frequency (LF) RFID tags at 134 KHz typically, high-frequency (HF) RFID tags at 13.56 MHz, ultra-high-frequency (UHF) RFID tags at 860~960 MHz, and microwave RFID tags at 2.4 GHz, and so on. The passive RFID tags have no power source internally and require an external electromagnetic field, that is mostly emitted from RFID readers, to power and activate an internal analog circuit embedded in the passive RFID tags for the chip operations. Generally, such RFID tag can be embedded with memories for data storage, and the memories can be read-only memories (ROM), write-once-read-many (WORM) memories or electrically erasable programmable read-only memories (EEPROM). Since the passive RFID tags and readers utilize the electromagnetic waves to transfer energy and signals, and their signal transmission performance, especially the frequency response of the RFID tags' antennas, can easily be affected by the material characteristics of the objects on which the RFID tags are attached, or even by the metallic objects as well as the conductive materials that are located neighboring thereto. That is, the metallic objects as well as the conductive materials, whichever are distributed neighboring to an RFID tags, will cause an interference phenomenon to be generated by a degree depending on the volume/area of those objects and also the distances there between, that will affect the reading performance of the RFID system. Moreover, since the electromagnetic waves used for signal transmission in the RFID system are invisible waves, neither the constructive interference nor the destructive interference caused by those surrounding metallic objects or conductive materials are not perceptible.

It is noted that most conventional storage cabinets are generally formed as an open-frame shelf rack composed of a plurality of posts and a plurality of partitions, whereas most of the partitions are made of plastic or wood. Under a condition when it is required to manage the storage capacity of a cabinet to a precision that allows the stocks in each and every compartment of the cabinet to be inventoried, such inventory operation for the conventional storage cabinet is generally very difficult to be automated, but instead will consume a mass amount of manpower, time and resources. Thus, it is usually for a store to close for the day just for performing the inventory operation, which is not only bad for business, but also is inconvenient to his/her consumers for shopping. On the other hand, if the inventory is not performed accurately, the operation of the store can be troubled by many problems, including: hot selling items are in short supply, but the slow selling items are in plenty, and some items in the store had exceeded their expiration dates. Overall, poor inventory can cause resource scheduling problem to the store, resulting in not only the increasing in the waste of substance as some items in the store may exceed their expiration dates before being sold, but also the increasing in the waste of storage capacity as those items that are slow selling or had expired can be left unnoticed on the shelves. The aforesaid problem can also be found in the field of library management since in most library, the on-shelf, off-shelf, book-searching and book inventory are performed manually by librarians that can be a very time-consuming and labor-intense operation.

SUMMARY OF THE INVENTION

In view of the disadvantages of prior art, the primary object of the present invention is to provide an RFID-based intelligent storage cabinet capable of detecting and acknowledging precisely the types and amount of items being stored in each and every compartment formed in the cabinet, and thereby, enabling a user to perform operations including: the control of storing/retrieving items into/from compartments of the cabinet, item searching, compartment displaying and indication, inventory management and control, compartment capacity utilization rate statistical analysis, through the use of a compartment management device for facilitating the commodity on-shelf/off-shelf control and management of the cabinet and thus optimizing the utilization of the storage compartments in the cabinet.

Another object of the present invention is to provide RFID-based intelligent storage cabinet capable of not only using the detection of bio sensors that are configured therein for enabling an inventory operation to be performed at a best timing by the use of RFID readers, but also the cabinet further has other sensors, such as infrared sensors, optical sensors or ultrasonic sensors, that are configured in the compartments formed in the cabinet so as to be used for detecting and determining whether their corresponding compartments are available or are already been occupied, and thus reducing the area in the cabinet required to be scanned by the RFID readers in an inventory operation, and thereby, not only achieving energy conservation and carbon reduction, but also the inventory control of the cabinet can be performed rapidly and accurately while optimizing the utilization of the storage compartments in the cabinet.

To achieve the above objects, the present invention provides a method for managing RFID-based intelligent storage cabinets, which comprises the steps of: providing an intelligent storage cabinet capable of performing an operation for controlling the storing/retrieving of items in/from compartment of the cabinet; and providing a compartment management system configured for performing operations of inventory management, compartment management, and information interrogation/displaying.

Moreover, to achieve the above objects, the present invention provides an RFID-based intelligent storage cabinet, comprising:

a cabinet, formed with at least one compartment that is provided for items to be stored therein and each has at least one antenna disposed therein to be used for detecting RFID tags attached on whichever items stored therein in an compartment management operation;

at least one sensor, configured for enabling the same to detect a specific object selected from the group consisting of: humans and items, and thus for controlling and adjusting the reading of the RFID tags according to the detection;

at least one digital interface, mounted on the cabinet for data transmission and control; and at least one displaying/indication device, mounted on a surface of the cabinet for providing an indication constructed by elements selected from the group consisting of: texts, graphics, colors and sounds.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
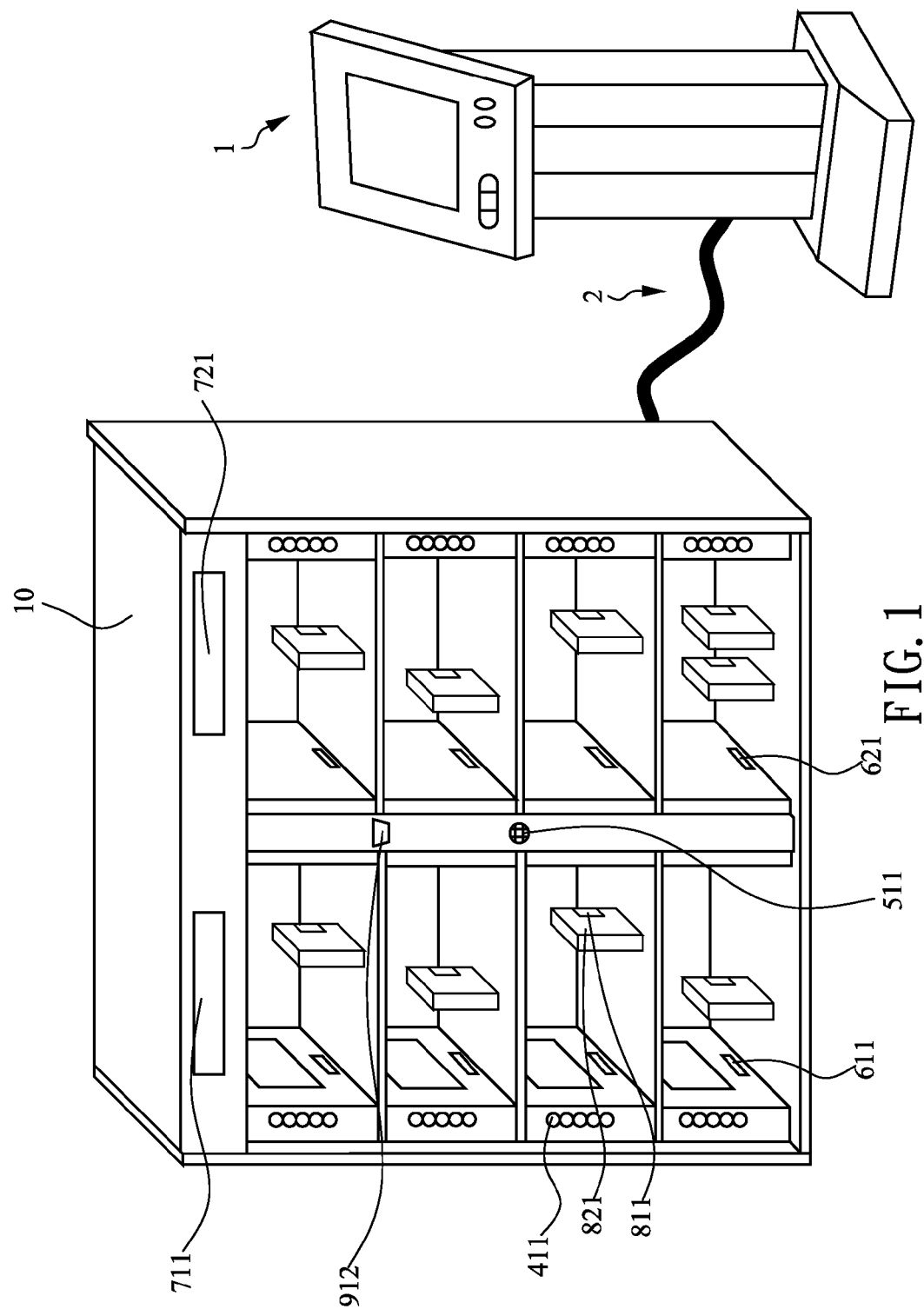
FIG. 1 is a schematic diagram showing an RFID-based intelligent storage cabinet according to the present invention.

There were days when libraries were considered as a storehouse of books. Today Libraries are much more than that. Libraries are now looked upon as information centers, where information is gathered, stored and disseminated to its members. With the ever-increasing sea of information, this modern function of the library is becoming very complex and tedious to handle manually, which is also true for warehouse management. Thus, the importance of having a good automation system and device is increasing. Please refer to FIG. 1, which is a schematic diagram showing an RFID-based intelligent storage cabinet according to the present invention. As shown in FIG. 1, the RFID-based intelligent storage cabinet 10 is connected to a compartment management system 1 through a digital interface 2, by that the RFID tags 811 attached on the items 821 stored in the compartments formed in the cabinet 10 can be scanned automatically while allowing the result of the scanning, e.g. information relating to the whereabouts of the items, can be displayed on the display devices 711 and 721. Thereby, a user is able to use a graphical human-machine interface of the compartment management system 1 to perform a compartment management operation upon the intelligent storage cabinet 10, to enquire the location of the compartment where his/her interested item is stored while capable of accessing the interested item rapidly according to the indication of an indication unit, such as the light devices 411 or audio devices 912. Moreover, in addition to the use of the detection of bio sensors 511 that are configured in the intelligent storage cabinet 10 for enabling an inventory operation to be performed at a best timing, the cabinet further has other sensors 611, such as infrared sensors, optical sensors or ultrasonic sensors, that are configured in the compartments so as to be used for detecting and determining whether their corresponding compartments are available or are already been occupied, and thus reducing the area in the cabinet required to be scanned by the RFID readers in the inventory operation. Thereby, not only achieving energy conservation and carbon reduction, but also the inventory control of the cabinet can be performed rapidly and accurately while optimizing the utilization of the storage compartments in the cabinet 10.

The compartment management system 1 further is configured for performing a user control operation, and thereby, enabling the compartment management system 1 to accept the input of account number, to access the identification numbers of RFID tags, and to be accessible with password control.

Moreover, the compartment management system 1 is configured to perform an inventory management operation upon the intelligent storage cabinet 10, and the inventory management operation is designed to provide information relating to the list of items stored in the cabinet 10 including the exact compartment where each and every item is stored, the amount of each item being stored, and the expiration date of each item being stored; and accord to the result of the inventory management operation, an operation of stock and expiration data control is enabled for optimizing the resource scheduling of the cabinet 10, resulting in not only the decreasing in the waste of substance as those items that are going to expire will be identified in advance, but also the decreasing in the waste of storage capacity as those items that are slow selling or had expired can be disposed early. Through the compartment management system 1, a user can easily enquire information relating to the items that are interested by the inputting of item names 821, item codes or the encoded data of the RFID tags 811 attached to the stored items, and then as soon as the compartment management system 1 will trigger and activate the lights 411 relating to the whereabouts of the interested items on the cabinet 10 for informing the user with the exact compartment where the interested items are stored.

Figure 2:
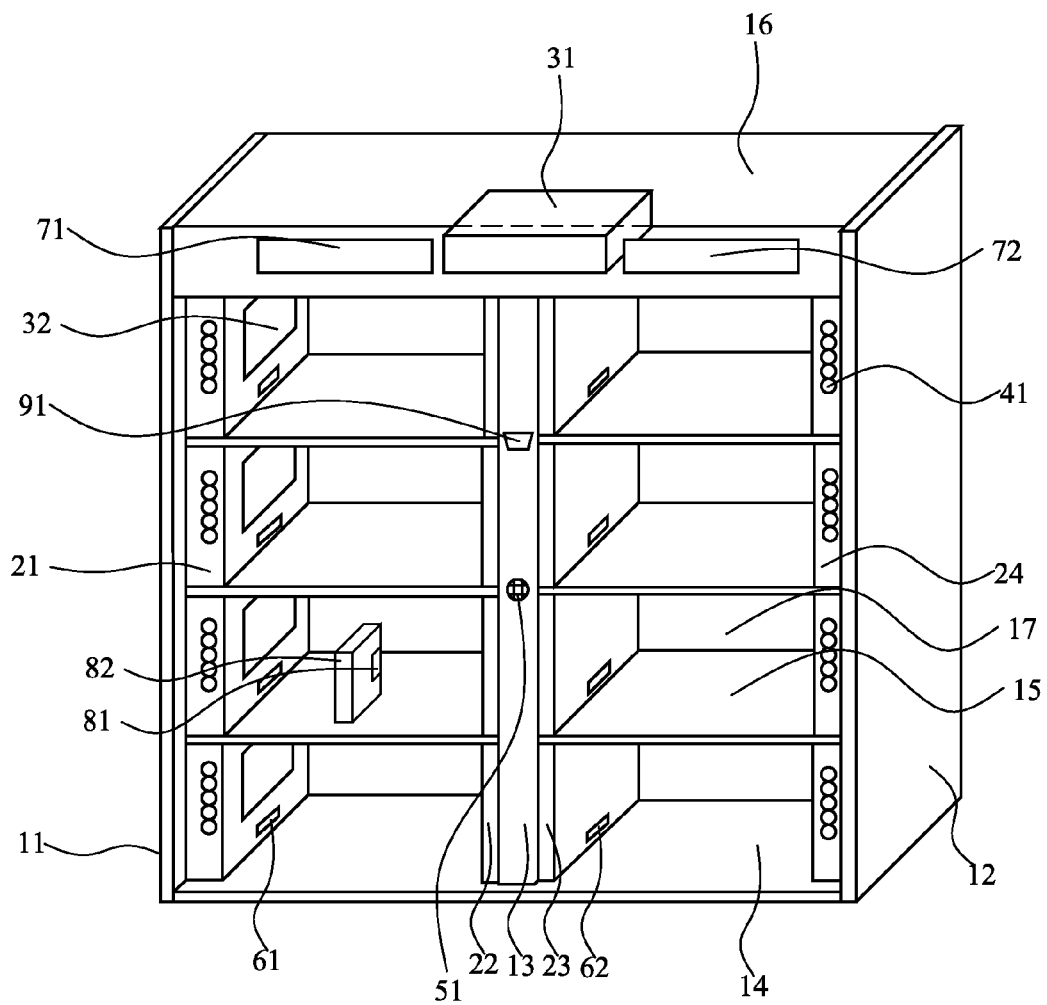
FIG. 2 is a schematic diagram showing the operation of an RFID-based intelligent storage cabinet of the present invention.
Figure 3:
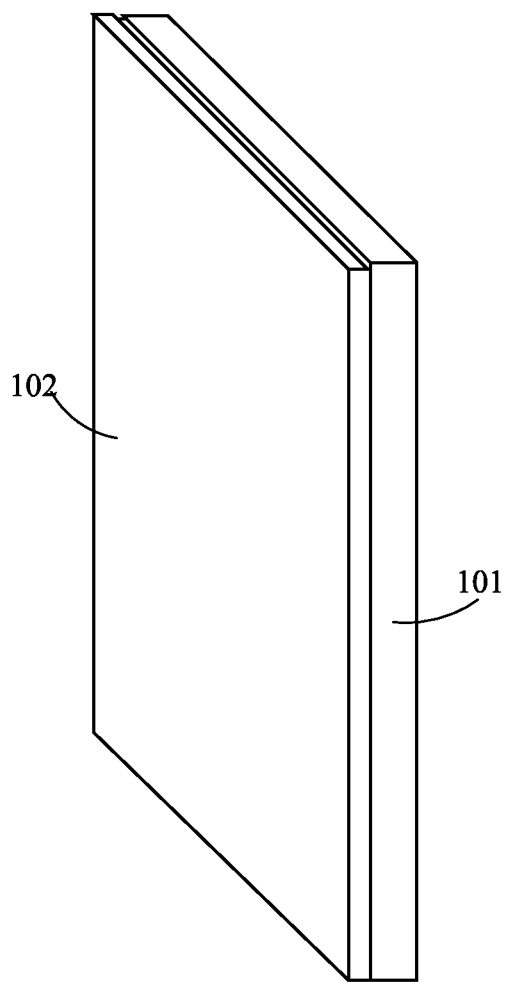
FIG. 3 is a schematic diagram showing the lamination of a metal plate and a wave absorbing plate used in an RFID-based intelligent storage cabinet of the present invention.

Please refer to FIG. 2, which is a schematic diagram showing the operation of an RFID-based intelligent storage cabinet of the present invention. It is noted that the intelligent storage cabinet itself can be designed with a variety of compartments according to the types of items to be stored therein. As shown in FIG. 2, the frame of the intelligent storage cabinet is composed of two side panels 11 and 12, a vertical dividing board 13, a bottom board 14, a plurality of horizontal dividing board 15, a cover plate 16 and a back plate 17, that can be made of a metal or a conductive material, whichever is capable of preventing the electromagnetic waves generated from the scanning of a RFID reader in one compartment from leaking into other compartments, so as to enhancing the accuracy of the compartment management operation. In addition, as the accuracy of the reading of the RFID tags attached on the items that are stored in the cabinet can easily be affected by the metallic objects or conductive objects disposed neighboring thereof, such as the metal frame of the cabinet, the cabinet is further configured with decorative partitions 21, 22, 23 and 24, that are made of non-metallic materials or non-conductive materials, or has the inside of boards and plates that are orientated toward the items stored therein to be covered by an wave absorbing material, such as the lamination of a metal plate 101 and a wave absorbing plate 102 shown in FIG. 3, whichever is capable of reducing the RFID tags from being affected by surrounding metallic objects while enhancing the aesthetic of the cabinet.

Moreover, each compartment formed in the cabinet has at least one antenna 32 disposed therein in a manner that each antenna 32 is electrically connected to an RFID reader 31 by an RF coaxial cable for enabling the RFID reader 31 to access information from the RFID tags for the compartment management operation. It is noted that there will be signal lost during the transmission in the RF coaxial cable, thus, if the RFID reader is disposed near to the cabinet, it is possible to connect one RFID reader to multiple antennas, however, if the RFID reader is disposed a distance away from the cabinet, it is better to connect one RFID reader to a single antenna for proper detection.

In this embodiment, the digital interface 2 is designed to connect to external computers or networks through a communication device for transmitting data and commands there between, and thus enabling the compartment management system 1 to perform operations including system control, file accessing and database linkage. In addition, the communication device is a device selected from the group consisting of: an Ethernet device, an RS-232 interface device, an RS-485 interface device, an RS-422 interface device and an USB interface device.

In a condition when the detection of the bio sensor 51 indicates the present of a human being, the RFID reader 31 enabled number of scans is increased for updating information in real time; and when no human being is detected, the RFID reader 31 enabled number of scans is decreased for reducing power consumption. Moreover, there can be sensors 61 and 62, such as infrared sensors, optical sensor and ultrasonic sensors, whichever is capable detecting and determining whether there is any item stored in a corresponding compartment, being arranged inside each and every compartment of the cabinet; and in a condition that when the detection of the sensors indicates the present of items 92 in the corresponding compartment, an item existing state is set and the RFID reader 31 checks the item existing state be set for enabling the scanning in a default manner; and in a condition that when the detection of the sensors indicates there is no item stored in the corresponding compartment, an item existing state is reset and the RFID reader 31 checks the item existing state be reset for preventing the scanning of the corresponding compartment so as to reduce power consumption.

Moreover, each of the display units 71 and 72 can be a device selected from the group consisting of: an electronic paper display device, a liquid crystal display device, a flat panel display device, whichever is capable of displaying information relating to the detection of the compartments of the cabinet. Among which, the electronic paper display device will consume power only when there is an update to the information already display thereon, so that it may be the best choice for the display unit of the intelligent storage cabinet. It is noted that the indication unit of the cabinet can include a light indicator devices 41 and/or an audio device 91, in which the light indicator devices 41 can be a device selected from the group consisting of: an indicator composed of lights of different colors, and an indicator composed of lights flashing at different frequencies, whichever is capable of pointing out the location of the compartment where the interested item is stored for accelerating the processing efficiency of the RFID-based intelligent storage cabinet. On the other hand, the audio device is substantially a device capable of outputting a series of audio signals, sounds of different frequencies, sound streams with different tempos, or music of different melodies, whichever is capable of pointing out the location of the compartment where the interested item is stored.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method for managing RFID-based intelligent storage cabinets, comprising the steps of:

providing an intelligent storage cabinet having at least one sensor disposed therein, and capable of performing an operation for controlling the storing/retrieving of items in/from compartment of the cabinet, wherein the sensor is a device selected from the group consisting of: an infrared sensor, an optical sensor and an ultrasonic sensor, and configured to detect a specific object selected from the group consisting of: humans and items, and thus for controlling and adjusting the reading of the RFID tags according to the detection, and capable of detecting and determining whether there is any item stored in a corresponding compartment, wherein when the detection of the sensor indicates the present of items in the corresponding compartment, an item existing state is set and an RFID reader checks the item existing state be set for enabling the scanning in a default manner, and wherein when the detection of the sensor indicates there is no item stored in the corresponding compartment, an item existing state is reset and an RFID reader checks the item existing state be reset for preventing the scanning of the corresponding compartment so as to reduce power consumption; and providing a compartment management system that is configured for performing operations of inventory management, compartment management, and information interrogation/displaying.

2. The method of claim 1, wherein the compartment management system further is configured for performing an user control operation, and thereby, enabling the compartment management system to accept the input of account number, to access the identification numbers of RFID tags, and to be accessible with password control.

3. The method of claim 2, wherein the performing of the user control operation further enables the compartment management system to obtain a list of compartment including the items stored therein from the intelligent storage cabinet, to calculate and obtain a compartment capacity utilization rate statistical analysis to be used in on-shelf/off-shelf control and management of the cabinet and thus optimize the utilization of the storage compartments in the cabinet.

4. The method of claim 1, wherein the inventory management operation of the compartment management system is designed to provide information relating to the list of items stored in the cabinet including the exact compartment where each and every item is stored, the amount of each item being stored, and the expiration date of each item being stored; and accord to the result of the inventory management operation, an operation of stock and expiration data control is enabled for optimizing the resource scheduling of the cabinet, resulting in not only the decreasing in the waste of substance as those items that are going to expire will be identified in advance, but also the decreasing in the waste of storage capacity as those items that are slow selling or had expired can be disposed early.

5. The method of claim 1, wherein the information interrogation/displaying operation of the compartment management system further includes an enquiring about item names, an inquire about item codes, and inquire about RFID tags, a displaying of information relating to the compartment where the enquired item is stored.

6. The method of claim 5, wherein the information interrogation/displaying operation of the compartment management system further includes the triggering and activating of a light indicator relating to the compartment where the enquired item is stored for informing an user the whereabouts of the enquired item.

7. An RFID-based intelligent storage cabinet, comprising:
a cabinet, formed with at least one compartment that is provided for items to be stored therein and each has at least one antenna disposed therein to be used for detecting RFID tags attached on whichever items stored therein in an compartment management operation;
at least one sensor, configured for enabling the same to detect a specific object selected from the group consisting of: humans and items, and thus for controlling and adjusting the reading of the RFID tags according to the detection;
at least one digital interface, mounted on the cabinet for data transmission and control; and
at least one displaying/indication device, mounted on a surface of the cabinet for providing an indication constructed by elements selected from the group consisting of: texts, graphics, colors and sounds,
wherein each sensor is a device selected from the group consisting of: an infrared sensor, an optical sensor and an ultrasonic sensor, whichever is capable of detecting and determining whether there is any item stored in a corresponding compartment, wherein when the detection of the sensor indicates the present of items in the corresponding compartment, an item existing state is set and an RFID reader checks the item existing state be set for enabling the scanning in a default manner, and wherein when the detection of the sensor indicates there is no item stored in the corresponding compartment, an item existing state is reset and an RFID reader checks the item existing state be reset for preventing the scanning of the corresponding compartment so as to reduce power consumption.

8. The cabinet of claim 7, wherein the frame of the cabinet is made of a material selected from the group consisting of: a metal and a conductive material, whichever is capable of preventing the electromagnetic waves generated from the scanning of a RFID reader in one compartment from leaking into other compartments, so as to enhancing the accuracy of the compartment management operation.

9. The cabinet of claim 8, wherein the cabinet is further configured with decorative partitions, each made of a material selected from the group consisting of: a non-metallic material and a non-conductive material, whichever is capable of reducing the RFID tags from being affected by surrounding metallic objects while enhancing the aesthetic of the cabinet.

10. The cabinet of claim 7, wherein each antenna is electrically connected to an RFID reader by an RF coaxial cable, for enabling the RFID reader to access information from the RFID tags for the compartment management operation.

11. The cabinet of claim 7, wherein the digital interface is designed to connect to external computers or networks through a communication device for transmitting data and commands there between, and thus performing operations including system control, file accessing and database linkage.

12. The cabinet of claim 11, wherein the communication device is a device selected from the group consisting of: an Ethernet device, an RS-232 interface device, an RS-485 interface device, an RS-422 interface device and an USB interface device.

13. The cabinet of claim 7, wherein each sensor is substantially a bio sensor, operating in a manner that: when the detecting of the bio sensor indicates the present of a human being, an RFID reader enabled number of scans is increased for updating information in real time; and when no human being is detected, an RFID reader enabled number of scans is decreased for reducing power consumption.

14. The cabinet of claim 7, wherein each displaying/indication device further comprises a display unit selected from the group consisting of: an electronic paper display device, a liquid crystal display device, a flat panel display device, whichever is capable of displaying information relating to the compartments of the cabinet.

15. The cabinet of claim 7, wherein the display unit is further configured with a light indicator selected from the group consisting of: an indicator composed of lights of different colors, and an indicator composed of lights flashing at different frequencies, whichever is capable of pointing out the location of the compartment where the interested item is stored for accelerating the processing efficiency of the RFID-based intelligent storage cabinet.

16. The cabinet of claim 7, wherein each displaying/indication device further comprises an indication unit, being substantially an audio device capable of outputting a series of audio signals, sounds of different frequencies, sound streams with different tempos, or music of different melodies, whichever is capable of pointing out the location of the compartment where the interested item is stored.

17. The cabinet of claim 7, wherein the interior wall of the cabinet is further being covered by a wave absorbing plate for reducing the reflection of electromagnetic waves inside the cabinet so as to decreasing the electromagnetic interference.

* * * * *